United States Patent
Jeong et al.

(10) Patent No.: US 8,013,968 B2
(45) Date of Patent: Sep. 6, 2011

(54) ARRAY SUBSTRATE FOR IN-PLANE SWITCHING MODE LIQUID CRYSTAL DISPLAY DEVICE AND FABRICATING METHOD OF THE SAME

(75) Inventors: Young-Min Jeong, Gyeonggi-do (KR); Su-Woong Lee, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 485 days.

(21) Appl. No.: 12/318,298

(22) Filed: Dec. 24, 2008

(65) Prior Publication Data
US 2009/0310073 A1   Dec. 17, 2009

(30) Foreign Application Priority Data

Jun. 13, 2008   (KR) ........................ 10-2008-0055902

(51) Int. Cl.
*G02F 1/1343*   (2006.01)
*G02F 1/1333*   (2006.01)
(52) U.S. Cl. ......... 349/141; 349/144; 349/139; 349/158
(58) Field of Classification Search .................. 349/141, 349/144, 139, 158; 438/30; 257/E21.535
See application file for complete search history.

(56) References Cited

U.S. PATENT DOCUMENTS

| 6,822,716 B2 * | 11/2004 | Lee et al. ...................... 349/141 |
| 7,551,257 B2 * | 6/2009 | Lee et al. ...................... 349/141 |
| 2009/0309822 A1 * | 12/2009 | Jeong et al. ..................... 345/92 |

* cited by examiner

*Primary Examiner* — Mike Qi
(74) *Attorney, Agent, or Firm* — Morgan, Lewis & Bockius LLP

(57) ABSTRACT

An array substrate for an in-plane switching mode liquid crystal display device particularly includes a first pattern in the pixel region on the passivation layer, the first pattern connected to the drain electrode through the first contact hole and overlapping the first extending portion, a plurality of first electrodes extending from the first pattern, the plurality of first electrodes parallel to the first and second data lines, a second pattern in the pixel region on the passivation layer and parallel to gate line, the second pattern electrically connected to the second data line, and a plurality of second electrodes extending from the second pattern and alternating with the plurality of first electrodes by a first distance between adjacent first and second electrodes, wherein one of the plurality of first electrodes is spaced apart from the second data line by a distance equal to the first distance or more than the first distance and less than double the first distance, and another of the plurality of first electrodes or one of the plurality of second electrodes is spaced apart from the first data line by a second distance narrower than the first distance.

14 Claims, 13 Drawing Sheets

ARRAY SUBSTRATE FOR IN-PLANE SWITCHING MODE LIQUID CRYSTAL DISPLAY DEVICE AND FABRICATING METHOD OF THE SAME

This application claims the benefit of Korean Patent Application No. 10-2008-0055902 filed in Korea on Jun. 13, 2008, which is hereby incorporated by reference for all purposes as if fully set forth herein.

BACKGROUND OF THE INVENTION

1. Field of the Invention

The invention relates to a liquid crystal display device, and more particularly, to an array substrate for an in-plane switching mode liquid crystal display device and a fabricating method of the same.

2. Discussion of the Related Art

Generally, a liquid crystal display (LCD) device uses optical anisotropy and polarization properties of liquid crystal molecules. The liquid crystal molecules have a definite alignment direction as a result of their thin and long shapes. The alignment direction of the liquid crystal molecules can be controlled by applying an electric field across the liquid crystal molecules. In other words, as the intensity or direction of the electric field is changed, the alignment of the liquid crystal molecules also changes. Since incident light is refracted based on the orientation of the liquid crystal molecules due to the optical anisotropy of the liquid crystal molecules, images can be displayed by controlling the light transmittance of the liquid crystal material.

Since the LCD device including thin film transistors as a switching element, referred to as an active matrix LCD (AM-LCD) device, has excellent characteristics of high resolution and displaying moving images, the AM-LCD device has been widely used.

The AM-LCD device includes an array substrate, a color filter substrate and a liquid crystal layer interposed therebetween. The array substrate may include a pixel electrode and thin film transistor, and the color filter substrate may include a color filter layer and a common electrode. The AM-LCD device is driven by an electric field between the pixel electrode and the common electrode to have excellent properties of transmittance and aperture ratio. However, since the AM-LCD device uses a vertical electric field that is perpendicular to the substrates, the AM-LCD device has poor viewing angles.

An in-plane switching (IPS) mode LCD device has been suggested and developed to resolve the above-mentioned limitations.

FIG. 1 is a cross-sectional view of a related art IPS mode LCD device. As shown in FIG. 1, the related art IPS mode LCD device includes an upper substrate 9 and a lower substrate 10 spaced apart from and facing each other. A liquid crystal layer 11 is interposed between the upper and lower substrates 9 and 10. A common electrode 17 and a pixel electrode 30 are formed on the lower substrate 10. The common electrode 17 and the pixel electrode 30 may be disposed on the same level. Liquid crystal molecules of the liquid crystal layer 11 are driven by a horizontal electric field L is induced between the common and pixel electrodes 17 and 30. Although not shown in the figure, a color filter layer is formed on the upper substrate 9. The lower substrate 10 including the common electrode 17 and the pixel electrode 30 may be referred to as an array substrate. The upper substrate 9 including the color filter layer may be referred to as a color filter layer.

FIGS. 2A and 2B are cross-sectional views showing turned on/off conditions, respectively, of a related art IPS mode LCD device. As shown in FIG. 2A, when the voltage is applied to the IPS mode LCD device, arrangement of liquid crystal molecules 11a above the common electrode 17 and the pixel electrode 30 is unchanged. However, liquid crystal molecules 11b between the common electrode 17 and the pixel electrode 30 are horizontally arranged due to the horizontal electric field L. Since the liquid crystal molecules 11b are arranged by the horizontal electric field L, the IPS mode LCD device has a characteristic of a wide viewing angle. For example, the IPS mode LCD device has a viewing angle of about 80 degrees to about 85 degrees up and down and right and left without an image inversion or a color inversion.

FIG. 2B shows a condition when the voltage is not applied to the IPS mode LCD device. Because an electric field is not induced between the common and pixel electrodes 17 and 30, the arrangement of liquid crystal molecules 11 is not changed.

FIG. 3 is a plan view illustrating a portion of an array substrate for a related art IPS mode LCD device. In FIG. 3, the array substrate 40 includes a gate line 43, a common line 47, a data line 60, a plurality of common electrodes 49a and 49b, a plurality of pixel electrodes 70 and a thin film transistor Tr. The gate line 43 extends along a first direction, and the common line 47 is parallel to the gate line 43. The data line 60 extends along a second direction perpendicular to the first direction to cross the gate line 43 and the common line 47. Particularly, a pixel region P is defined by a crossing of the gate and data lines 43 and 60.

The thin film transistor Tr is disposed at a crossing portion of the gate and data lines 43 and 60. The thin film transistor Tr includes a gate electrode 45, a semiconductor layer 50, a source electrode 53 and a drain electrode 55. The source electrode 53 extends from the data line 60, and the gate electrode 45 extends from the gate line 43. The pixel electrodes 70 are connected to the drain electrode 55 through a drain contact hole 67 and disposed in the pixel region P. The common electrodes 49a and 49b are alternately arranged with the pixel electrodes 70 and extend from the common line 47.

The common electrodes include first common electrodes 49a and a second common electrode 49b. The second common electrode 49b is disposed between the first common electrodes 49a, and each of the first common electrodes 49a is disposed adjacently to the data line 60. In this case, each first common electrode 49a is spaced apart from the data line 60 with a predetermined distance. A common voltage is applied to the common electrodes 49a and 49b through the common line 47, which is horizontally across the pixel region P in the context of the figure, and an additional compensation or tuning for a difference in a common voltage resulted from charging of a constant voltage is required. Accordingly, production costs increase and a fabricating process is complicated.

In addition, the first common electrodes 49a is spaced apart from the data line 60 to prevent signal interference between the first common electrodes 49a and the data line 60, and the pixel electrodes 70 and the second common electrode 49b are alternately arranged. Therefore, an aperture ratio of the IPS mode LCD device decreases.

SUMMARY OF THE INVENTION

Accordingly, the present invention is directed to an array substrate for an in-plane switching mode liquid crystal display device and a fabricating method of the same that substantially obviate one or more of the problems due to limitations and disadvantages of the related art.

An object of the present invention is to provide an array substrate for an in-plane switching mode liquid crystal display device and a fabricating method of the same that improve the aperture ratio without a common line and a common electrode.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of embodiments of the invention, as embodied and broadly described, a array substrate for an in-plane switching mode liquid crystal display device includes a gate line on a substrate, a gate insulating layer on the gate line, first and second data lines on the gate insulating layer and crossing the gate line to define a pixel region, a first extending portion on the gate insulating layer and extending from the second data line, a thin film transistor connected to the gate line and the first data line, a passivation layer on the first and second data lines and the thin film transistor, the passivation layer having a first contact hole exposing a drain electrode of the thin film transistor, a first pattern in the pixel region on the passivation layer, the first pattern connected to the drain electrode through the first contact hole and overlapping the first extending portion, a plurality of first electrodes extending from the first pattern, the plurality of first electrodes parallel to the first and second data lines, a second pattern in the pixel region on the passivation layer and parallel to gate line, the second pattern electrically connected to the second data line, and a plurality of second electrodes extending from the second pattern and alternating with the plurality of first electrodes by a first distance between adjacent first and second electrodes, wherein one of the plurality of first electrodes is spaced apart from the second data line by a distance equal to the first distance or more than the first distance and less than double the first distance, and another of the plurality of first electrodes or one of the plurality of second electrodes is spaced apart from the first data line by a second distance narrower than the first distance.

In another aspect, a fabricating method of an array substrate for an in-plane switching mode liquid crystal display device includes forming a gate line on a substrate, forming a gate insulating layer on the gate line, forming first and second data lines on the gate insulating layer and crossing the gate line to define a pixel region, forming a first extending portion on the gate insulating layer and extending from the second data line, forming a thin film transistor connected to the gate line and the first data line, forming passivation layer on the first and second data lines and the thin film transistor, the passivation layer having a first contact hole exposing a drain electrode of the thin film transistor, forming a first pattern in the pixel region on the passivation layer, the first pattern connected to the drain electrode through the first contact hole and overlapping the first extending portion, forming a plurality of first electrodes extending from the first pattern, the plurality of first electrodes parallel to the first and second data lines, forming a second pattern in the pixel region on the passivation layer and parallel to gate line, the second pattern electrically connected to the second data line, and forming a plurality of second electrodes extending from the second pattern and alternating with the plurality of first electrodes by a first distance between adjacent first and second electrodes, wherein one of the plurality of first electrodes is spaced apart from the second data line by a distance equal to the first distance or more than the first distance and less than double the first distance, and another of the plurality of first electrodes or one of the plurality of second electrodes is spaced apart from the first data line by a second distance narrower than the first distance.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF EXEMPLARY EMBODIMENTS

Reference will now be made in detail to exemplary embodiments of the invention, which are illustrated in the accompanying drawings.

Figure 4:
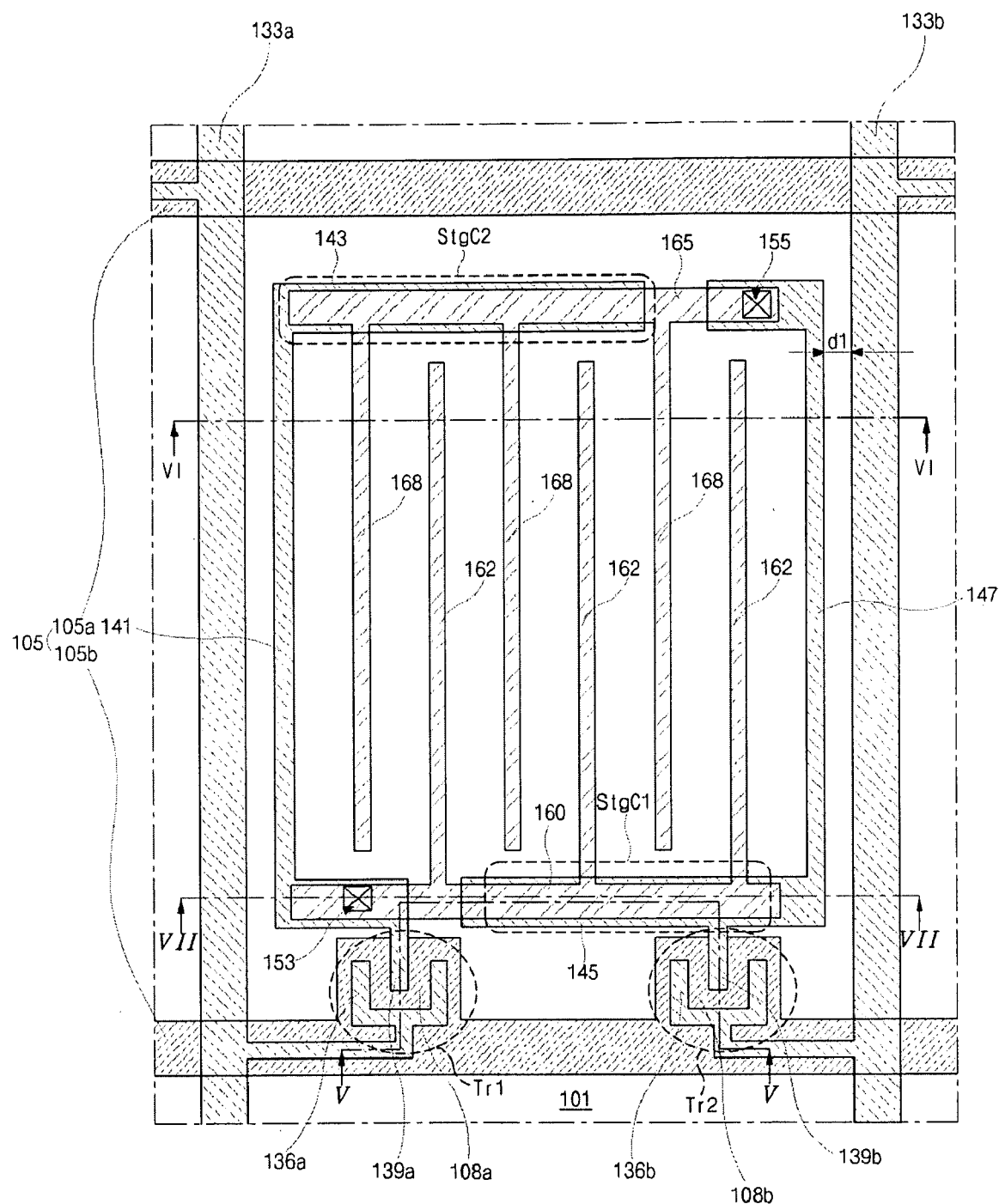
FIG. 4 is a plan view of schematic illustrating one pixel region of an exemplary array substrate for an IPS mode LCD device according to a first embodiment of the invention.

FIG. 4 is a plan view of schematic illustrating one pixel region of an exemplary array substrate for an in-plane switching (IPS) mode liquid crystal display (LCD) device according to a first embodiment of the invention. In FIG. 4, the array substrate includes first and second gate lines 105a and 105b and first and second data lines 133a and 133b on a substrate 101. The first and second data lines 133a and 133b cross the first and second gate lines 105a and 105b to define a pixel region P.

First and second thin film transistors Tr1 and Tr2 are formed in the pixel region P. The first thin film transistor Tr1 is disposed at a crossing portion of the second gate line 105b and the first data line 133a, and the second thin film transistor Tr2 is disposed at a crossing portion of the second gate line 105b and the second data line 133b. The first thin film transistor Tr1 is connected to the second gate line 105b and the first data line 133a, and the second thin film transistor Tr2 is connected to the second gate line 105b and the second data line 133b. Although not shown, there are also two thin film transistors in an upper pixel region of the pixel region P in FIG. 4. One of the two thin film transistors in the upper pixel region is connected to the first gate line 105a and the first data line 133a, and the other of the two thin film transistors in the upper pixel region is connected to the first gate line 105a and the second data line 133b. Hereinafter, the first and second gate lines 105a and 105b are referred to a gate line 105.

The first thin film transistor Tr1 includes a first gate electrode 108a, a gate insulating layer (not shown), a first semiconductor layer (not shown), which includes a first active layer (not shown) of intrinsic amorphous silicon and a first ohmic contact layer (not shown) of impurity-doped amorphous silicon, a first source electrode 136a and a first drain electrode 139a. The first semiconductor layer and the gate insulating layer are stacked on the first gate electrode 108a, and the first source electrode 136a and the first drain electrode 139a are formed on the first semiconductor layer. The first source electrode 136a is spaced apart from the first drain electrode 139a. The second thin film transistor Tr2 includes a second gate electrode 108b, a gate insulating layer (not shown), a second semiconductor layer (not shown), which includes a second active layer (not shown) of intrinsic amorphous silicon and a second ohmic contact layer (not shown) of impurity-doped amorphous silicon, a second source electrode 136b and a second drain electrode 139b. The second semiconductor layer and the gate insulating layer are stacked on the second gate electrode 108b, and the second source electrode 136b and the second drain electrode 139b are formed on the second semiconductor layer. The second source electrode 136b is spaced apart from the second drain electrode 139b.

The first gate electrode 108a and the second gate electrode 108b are connected to the gate line 105. The first source electrode 136a and the second source electrode 136b are connected to the first and second data lines 133a and 133b, respectively.

In the pixel region P, a first electrode 141 is formed parallel with the first data line 133a to be adjacent to the first data line 133a. End portions of the first electrode 141 are bent. One end portion of the first electrode 141 is connected to the first drain electrode 139a of the first thin film transistor Tr1, and the other end portion of the first electrode 141 extends along the gate line 105. The other end portion of the first electrode 141 is defined as a first extending portion 143. In the pixel region P, a second electrode 147 is formed parallel with the second data line 133b to be adjacent to the second data line 133b. End portions of the second electrode 147 are bent. One end portion of the second electrode 147 is connected to the second drain electrode 139b of the second thin film transistor Tr2, and the other end portion of the second electrode 147 is extended parallel with the gate line 105 and faces the other end portion of the first electrode 141, that is, the first extending portion 143. The one end portion of the second electrode 147 further extends along the gate line 105 and faces the one end portion of the first electrode 141. The one end portion of the second electrode 147 is defined as a second extending portion 145.

In addition, first and second patterns 160 and 165 is formed parallel with and spaced apart from the gate line 105. The first pattern 160 is located between the gate line 105 and the second pattern 165. The first pattern 160 is connected to the first electrode 141 through a first contact hole 153, and the second pattern 165 is connected to the second electrode 147 through a second contact hole 155. The first contact hole 153 corresponds to the one end portion of the first electrode 141, and the second contact hole 155 corresponds to the other end portion of the second electrode 147. Since the first electrode 141 extends from the first drain electrode 139a, the first contact hole 153 may correspond to a portion of the first drain electrode 139a.

Furthermore, in the pixel region P, a plurality of third electrodes 162 extend from the first pattern 160 and are spaced apart from each other. A plurality of fourth electrodes 168 extend from the second pattern 165 and are spaced apart from each other. The third electrodes 162 and the fourth electrodes 168 are parallel with the data lines 133a and 133b and alternately arranged with each other between the first and second patterns 160 and 165 and between the first and second electrodes 141 and 147.

The first pattern 160 overlaps the second extending portion 145 of the second electrode 147 such that overlapped portions of the first pattern 160, the second extending portion 145 of the second electrode 147 and an insulating material layer (not shown) therebetween constitute a first storage capacitor StgC1. The second pattern 165 overlaps the first extending portion 143 of the first electrode 141 such that overlapped portions of the second pattern 165, the first extending portion 143 of the first electrode 141 and an insulating material layer (not shown) therebetween constitute a second storage capacitor StgC2.

In the array substrate according to an embodiment of the invention, a high signal voltage, which is greater than a reference voltage, is applied into the first data line 133a in a pulse profile, and a low signal voltage, which is smaller than a reference voltage, is applied into the second data line 133b in a pulse profile. The third electrodes 162 are electrically connected to the first data line 133a through the first pattern 160, the first contact hole 153, the first electrode 141 and the first thin film transistor Tr1. The fourth electrodes 168 is electrically connected to the second data line 133b through the second pattern 165, the second contact hole 155, the second electrode 147 and the second thin film transistor Tr2. Accordingly, there is a voltage difference in the third and fourth electrodes 162 and 168 due to the high and low signal voltage in the pulse profile. As a result, a horizontal electric field is induced between the third and fourth electrodes 162 and 168. Even if the first and second thin film transistors Tr1 and Tr2 have an off state, the voltage difference in the third and fourth electrodes 162 and 168 is maintained by the first and second storage capacitors StgC1 and StgC2 until the first and second thin film transistors Tr1 and Tr2 turn on.

Figure 1:
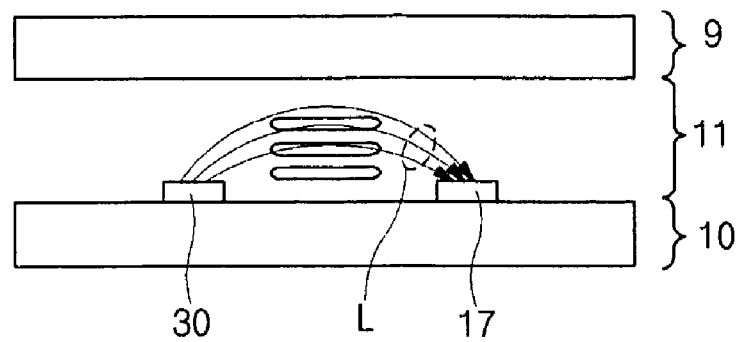
FIG. 1 is a cross-sectional view of a related art IPS mode LCD device.
Figure 2A:
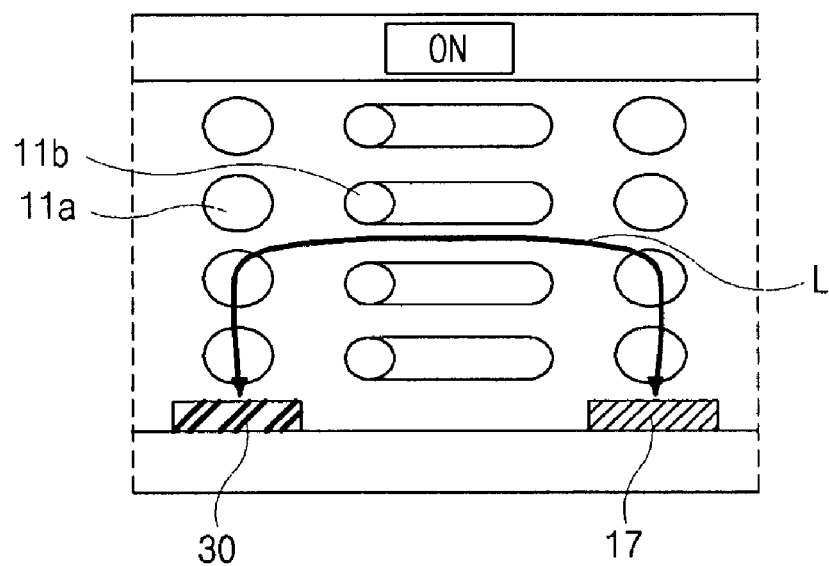
FIGS. 2A and 2B are cross-sectional views showing turned on/off conditions, respectively, of a related art IPS mode LCD device.
Figure 2B:
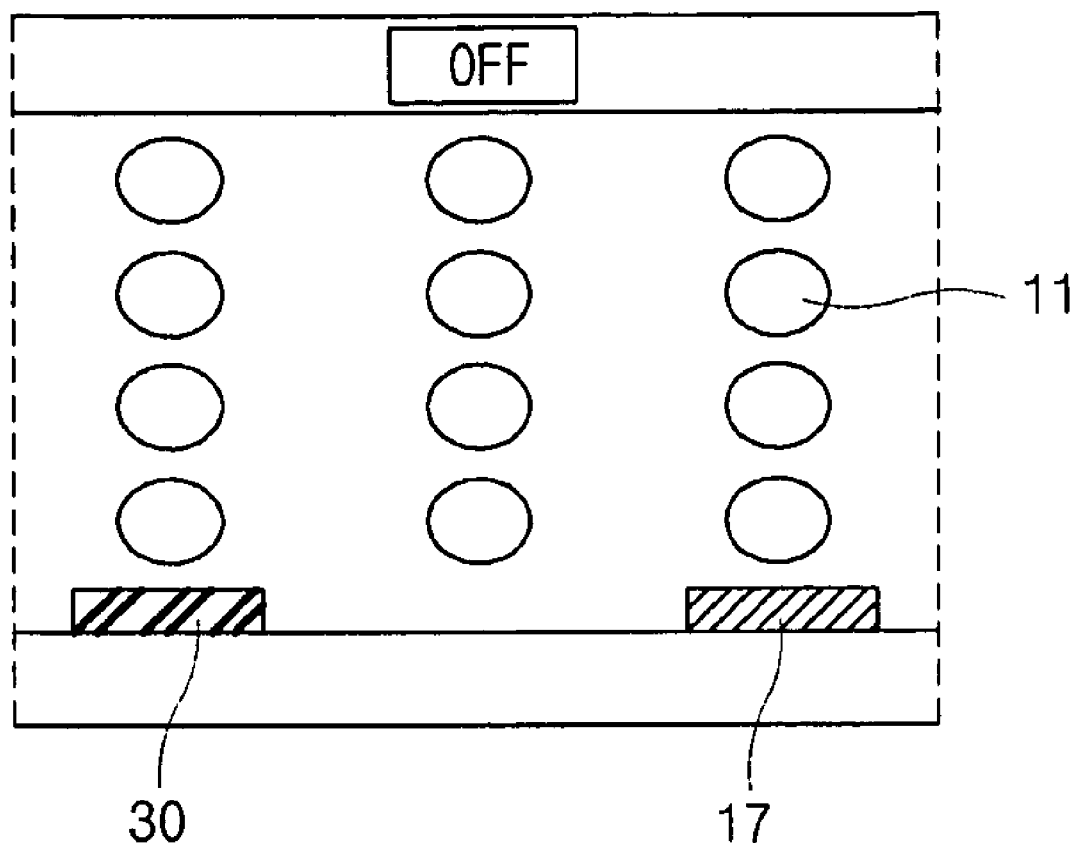
Figure 3:
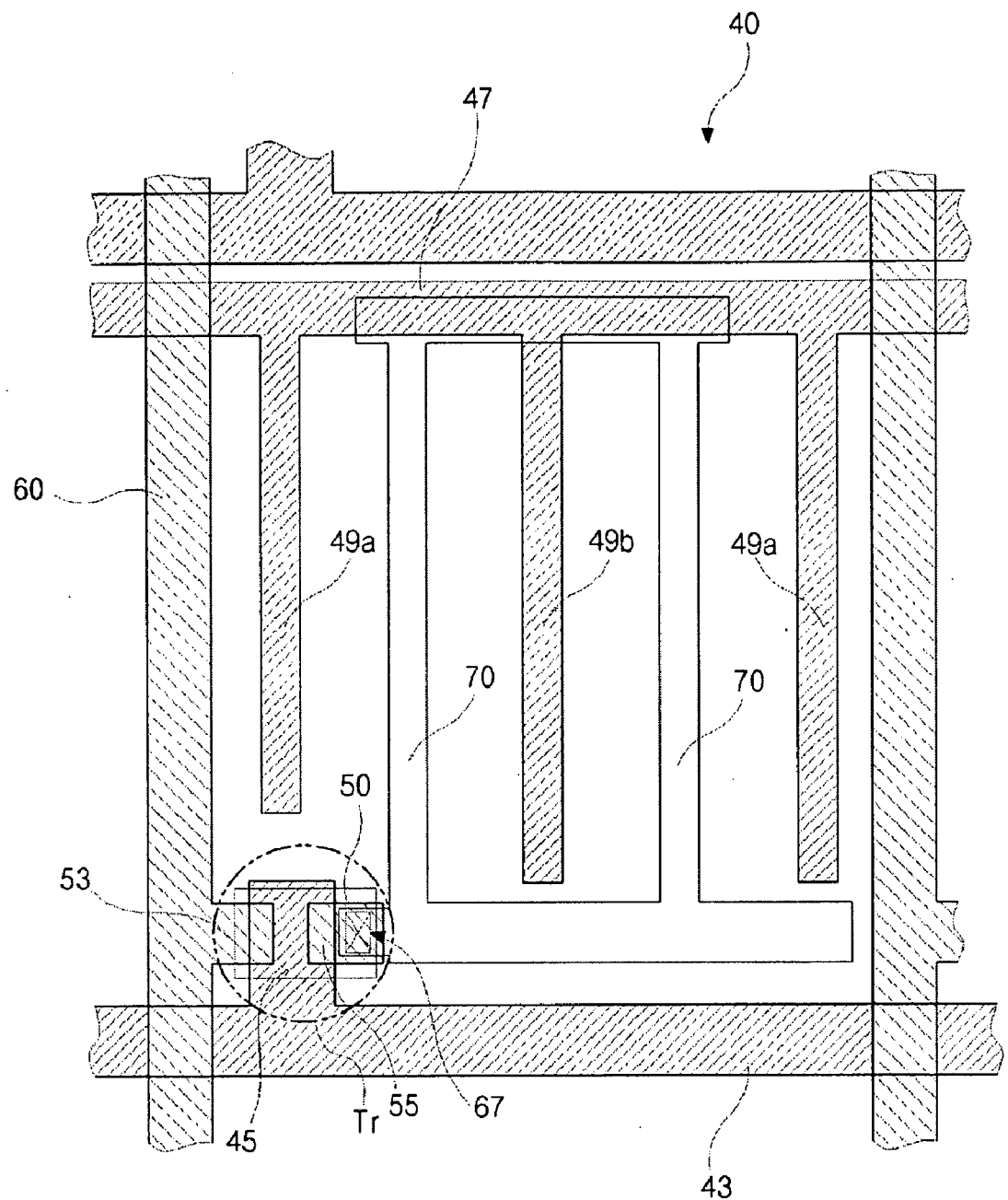
FIG. 3 is a plan view illustrating a portion of an array substrate for a related art IPS mode LCD device.

Being compared with the related art array substrate in FIG. 3, there is no common electrode adjacent to the data line. Accordingly, an additional compensation or tuning for a difference in a common voltage resulted from charging of a constant voltage is not required. As a result, production costs can decrease and a fabricating process can be simplified. In addition, since the high and low signal voltages have a pulse profile, problems such as a flicker phenomenon or voltage difference due to signal change can be prevented such that the IPS mode LCD device has an improved image quality.

A cross-sectional structure of the array substrate according to the first embodiment of the invention in FIG. 4 is explained with reference to accompanying drawings.

Figure 5:
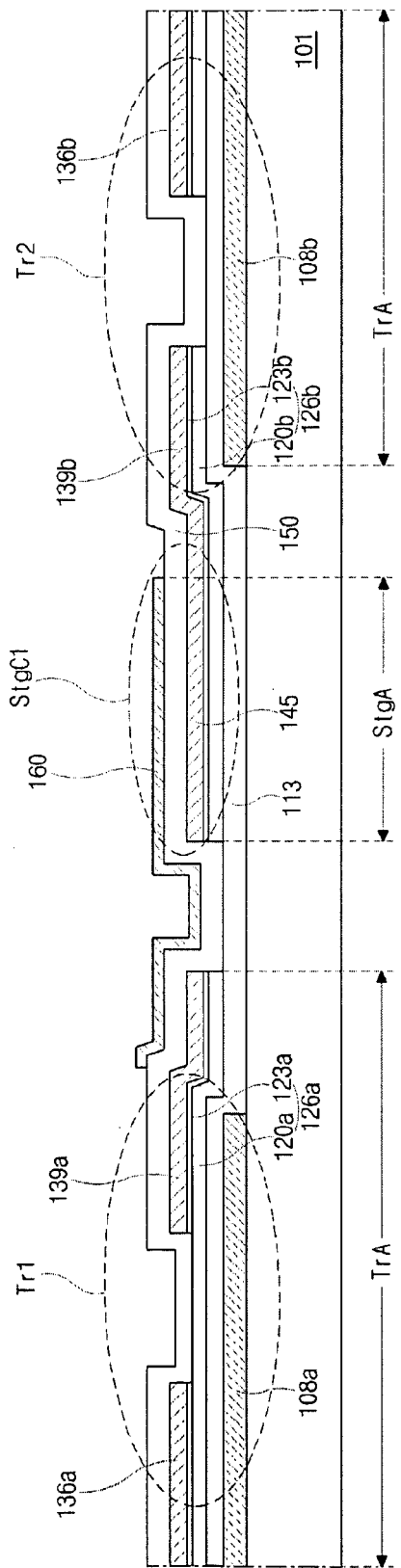
FIG. 5 is a cross-sectional view taken along the line V-V of FIG. 4.
Figure 6:
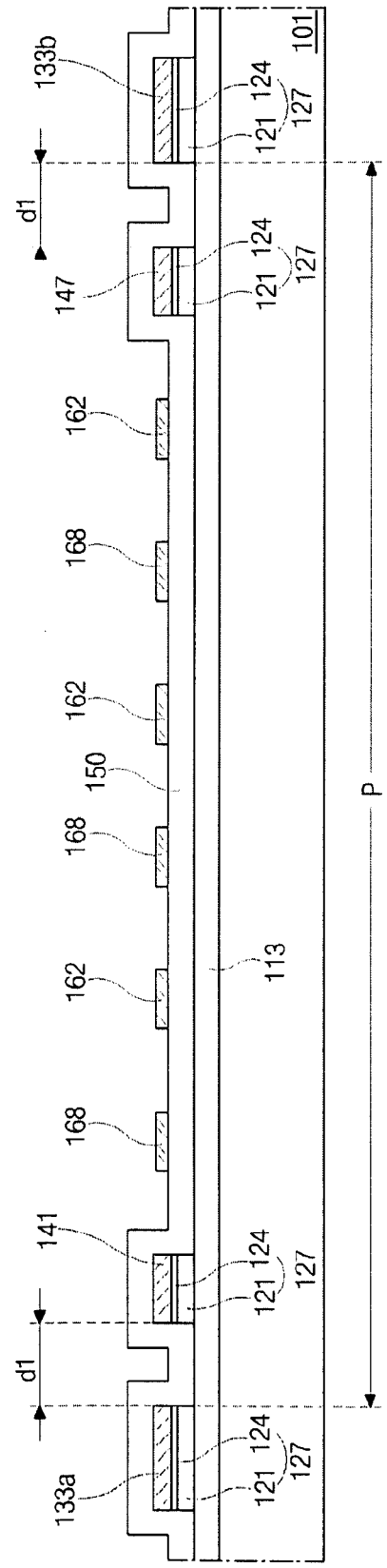
FIG. 6 is a cross-sectional view taken along the line VI-VI of FIG. 4.
Figure 7:
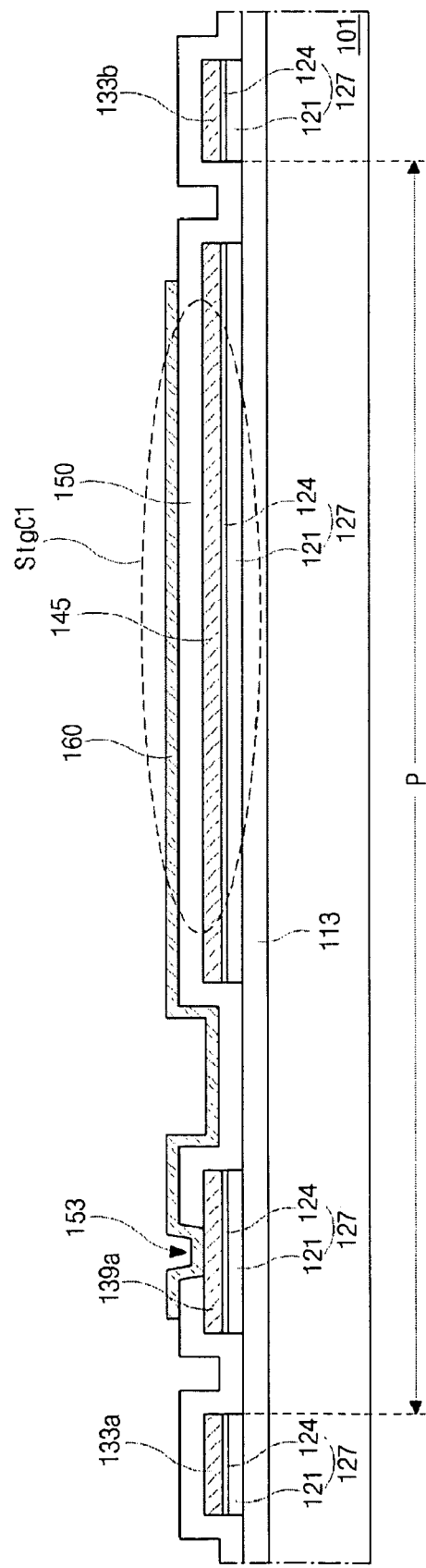
FIG. 7 is a cross-sectional view taken along the line VII-VII of FIG. 4.

FIG. 5 is a cross-sectional view taken along the line V-V of FIG. 4, FIG. 6 is a cross-sectional view taken along the line VI-VI of FIG. 4, and FIG. 7 is a cross-sectional view taken along the line VII-VII of FIG. 4. Here, for the convenience of explanation, switching regions TrA, where the first and second thin film transistors are formed, and a storage region StgA, where the first storage capacitor is formed, are defined. Referring to FIGS. 4, 5, 6 and 7, the gate lines 105 of FIG. 4 and the first and second gate electrodes 108a and 108b of a first metallic material are formed on the substrate 101. The first and second gate electrodes 108a and 108b are disposed in the switching regions TrA, respectively, and connected to respective gate lines.

A gate insulating layer 113 of an inorganic insulating material is formed on the gate lines and the first and second gate electrodes 108a and 108b. The first and second data lines 133a and 133b of a second metallic material are formed on the gate insulating layer 113. The first and second data lines 133a and 133b cross the gate lines to define the pixel region P. In the switching regions TrA, a first semiconductor layer 126a including a first active layer 120a and a first ohmic contact layer 123a and a second semiconductor layer 126b including a second active layer 120b and a second ohmic contact layer 123b are formed on the gate insulating layer 113. The first semiconductor layer 126a and the second semiconductor layer 126b correspond to the first and second gate electrodes 108a and 108b, respectively. The first source electrode 136a and the first drain electrode 139a, which are spaced apart from each other, are formed on the first semiconductor layer 126a. The second source electrode 136b and the second drain electrode 139b, which are spaced apart from each other, are formed on the second semiconductor layer 126b. The first source electrode 136a is connected to the first data line 133a, and the second source electrode 136b is connected to the second data line 133b. Each of the first source electrode 136a, the first drain electrode 139a, the second source electrode 136b and the second drain electrode 139b may be formed of the same material as the first and second data lines 133a and 133b. The first gate electrode 108a, the gate insulating layer 113, the first semiconductor layer 126a, the first source electrode 136a and the first drain electrode 139a constitute the first thin film transistor Tr1. The second gate electrode 108b, the gate insulating layer 113, the second semiconductor layer 126b, the second source electrode 136b and the second drain electrode 139b constitute the second thin film transistor Tr2.

In addition, the first electrode 141, which is parallel and adjacent to the first data line 133a, is formed on the gate insulating layer 113. The first electrode 141 is connected to the first drain electrode 139a and formed of the same material as the first drain electrode 139a. One end of the first electrode 141 is connected to the first drain electrode 139a, and the first extending portion 143 of FIG. 4 extends from the other end of the first electrode 141 into a region where the second storage capacitor StgC2 is formed. The first extending portion 143 of the first electrode 141 is defined as a first capacitor electrode of the second storage capacitor StgC2 of FIG. 4.

The second electrode 147, which is parallel and adjacent to the second data line 133b, is formed on the gate insulating layer 113. The second electrode 147 is connected to the second drain electrode 139b and formed of the same material as the second drain electrode 139b. One end of the second electrode 147 is connected to the second drain electrode 139b, and the second extending portion 145 extends from the one end of the second electrode 147 into the storage region StgA where the first storage capacitor CstgC1 is formed. The second extending portion 145 of the second electrode 147 is defined as a first capacitor electrode of the first storage capacitor StgC1.

A semiconductor pattern 127 having a double-layered structure of a first semiconductor pattern 124 and a second semiconductor pattern 121 is formed under each of the first and second data lines 133a and 133b, the first electrode 141 and the second electrode 147. The first semiconductor pattern 124 is formed of the same material as the ohmic contact layers 123a and 123b, and the second semiconductor pattern 121 is formed of the same material as the active layers 120a and 120b. The semiconductor pattern 127 may be formed under each of the first and second data lines 133a and 133b, the first electrode 141 and the second electrode 147 according to a fabricating method of the array substrate. The semiconductor pattern 127 may be omitted by another fabricating process.

A passivation layer 150 is formed on the first and second data lines 133a and 133b, the first and second thin film transistors Tr1 and Tr2, and the first and second electrodes 141 and 147. The passivation layer 150 has the first and second contact holes 153 and 155 respectively exposing a portion of the first drain electrode 139a and a portion of the second electrode 147. The passivation layer 150 may be formed of one of an inorganic insulating material and an organic insulating material.

The first pattern 160 of a third metallic material is formed on the passivation layer 150. The first pattern 160 contacts the first drain electrode 139a through the first contact hole 153 and overlaps the second extending portion 145 of the second electrode 147. An overlapped portion of the first pattern 160 is defined as a second capacitor electrode of the first storage capacitor StgC1. The second extending portion 145 of the second electrode 147 as the first capacitor electrode, the overlapped portion of the first pattern 160 as the second capacitor electrode, and the passivation layer 150 as a dielectric material layer constitute the first storage capacitor StgC1. In addition, the plurality of third electrodes 162 extend from the first pattern 160 and are spaced apart from each other. The second pattern 165 is formed on the passivation layer 150. The second pattern 165 contacts the second electrode 147 through the second contact hole 155 and overlaps the first extending portion 143 of FIG. 4 of the first electrode 141. The second pattern 165 is spaced apart from and parallel to the first pattern 160. An overlapped portion of the second pattern 165 is defined as a second capacitor electrode of the second storage capacitor StgC2 of FIG. 4. The first extending portion 143 of FIG. 4 of the first electrode 141 as the first capacitor electrode, the overlapped portion of the second pattern 165 as the second capacitor electrode, and the passivation layer 150 as a dielectric material layer constitute the second storage capacitor StgC2 of FIG. 4. In addition, the plurality of fourth electrodes 168 extend from the second pattern 165 and are spaced apart from each other. The third electrodes 162 and the fourth electrodes 168 are alternately arranged with each other. The second pattern 165, the third electrodes 162 and the fourth electrodes 168 may be formed of the same material as the first pattern 160.

In the above-mentioned array substrate according to the first embodiment of the invention, the first electrode 141 is formed at the same layer and the same material as the first data line 133a. In addition, the first electrode 141 is disposed to be adjacent to the first data line 133a. Moreover, the second electrode 147 is formed at the same layer and the same material as the second data line 133b. The second electrode 147 is disposed to be adjacent to the second data line 133b. To prevent an electrical short problem between the first data line 133a and the first electrode 141 and between the second data line 133b and the second electrode 147, the first and second electrodes 141 and 147 are spaced apart from the first and second data lines 133a and 133b, respectively, by the first distance d1 of 5 μm to 7 μm, for example. Although the array substrate of FIG. 4 has an improved aperture ratio with compared to the related art array substrate, a limitation in an aperture ratio still exists.

A second embodiment of the invention will be described hereinafter with reference to accompanying drawings. The second embodiment suggests an array substrate for an IPS mode LCD device having more improved aperture ratio as compared with the first embodiment.

Figure 8:
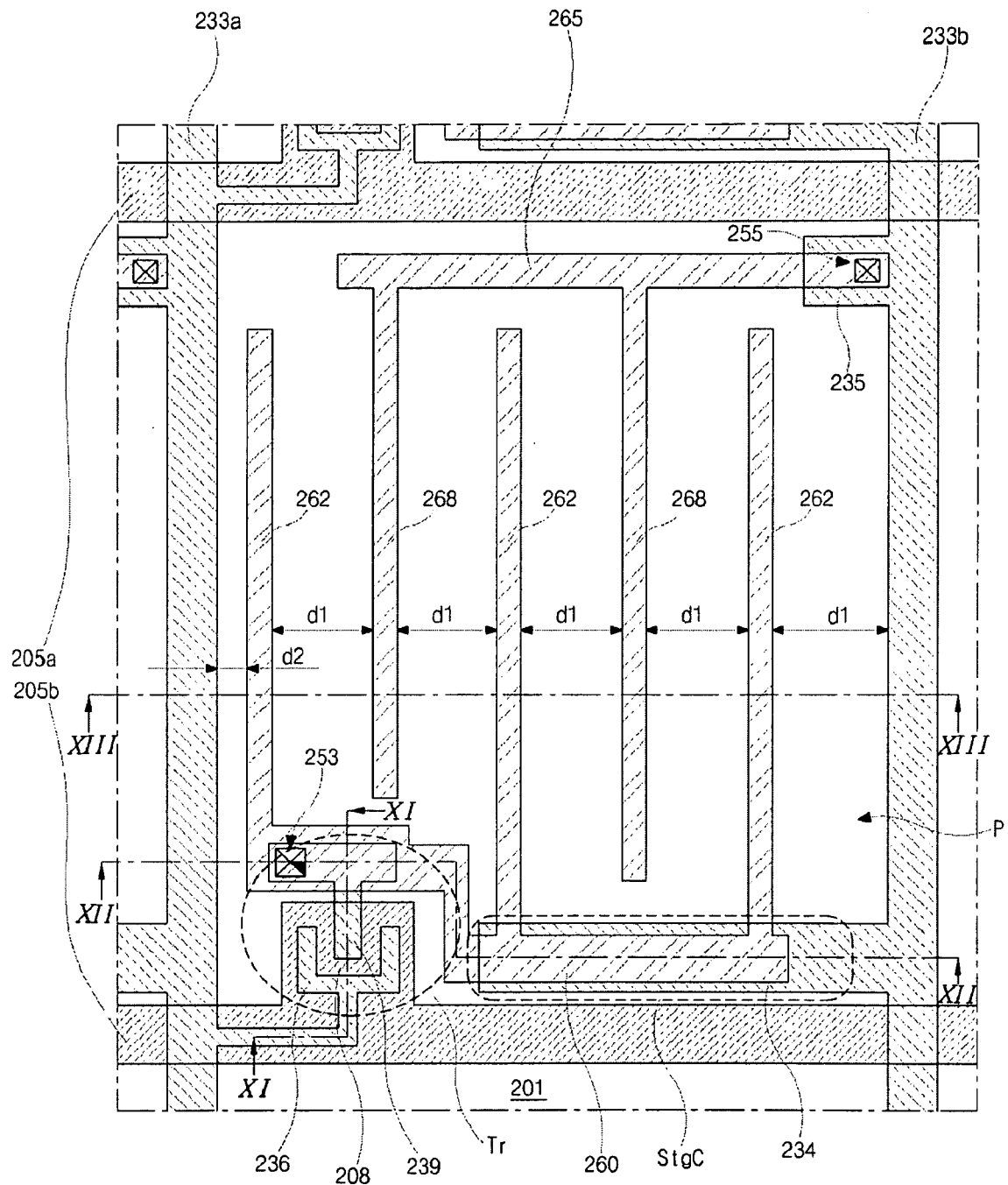
FIG. 8 is a plan view of schematically illustrating one pixel region of an exemplary array substrate for an IPS mode LCD device according to a second embodiment of the invention.

FIG. 8 is a plan view schematically illustrating one pixel region of an exemplary array substrate for an IPS mode LCD device according to a second embodiment of the invention. In FIG. 8, the array substrate includes first and second gate lines 205a and 205b formed on a substrate 201 along a direction and spaced apart from each other. First and second data lines 233a and 233b cross the first and second gate lines 205a and 205b to define a pixel region P and are spaced apart from each other.

In the pixel region P, a thin film transistor Tr is formed at a crossing portion of the second gate line 205b and the first data line 233a. The thin film transistor Tr is connected to the second gate line 205b and the first data line 233a. In the second embodiment, a thin film transistor at a crossing portion of the second data line 233b and the second gate line 205 is omitted differently from the first embodiment. Accordingly, in the array substrate for an IPS mode LCD device according to the second embodiment of the present invention, one thin film transistor Tr is formed in one pixel region P.

The thin film transistor Tr includes a gate electrode 208, a gate insulating layer (not shown), a semiconductor layer (not shown) including an active layer (not shown) of intrinsic amorphous silicon and an ohmic contact layer (not shown) of impurity-doped amorphous silicon, and source and drain electrodes 236 and 239 spaced apart from each other. Here, the source electrode 236 of the thin film transistor Tr is connected to the first data line 233a.

In addition, a first extending portion 234 extends from the second data line 233b into the pixel region P. The first extending portion 234 is adjacent to the second gate line 205b disposed in a lower area of the pixel region P and is parallel to the second gate line 205b. A second extending portion 235 is connected to the second data line 233b and is adjacent to the first gate line 205a disposed in an upper area of the pixel region P.

In the pixel region P, a first pattern 260 is connected to the drain electrode 239 of the thin film transistor Tr through a first contact hole 253 and overlaps the first extending portion 234. A plurality of first electrodes 262 extend from the first pattern 260. The first electrodes 262 are parallel to the first and second data lines 233a and 233b and spaced apart from each other. The first extending portion 234 and the first pattern 260 constitute a storage capacitor StgC with an insulating material layer therebetween. A left outer one of the first electrodes 262 is adjacent to the first data line 233a.

Moreover, in the pixel region P, a second pattern 265 is connected to the second extending portion 235 through a second contact hole 255. The second pattern 265 is adjacent to and parallel with the first gate line 205a. A plurality of second electrodes 268 extend from the second pattern 265. The second electrodes 268 are parallel and alternately arranged with the first electrodes 262. Here, the second data line 233b functions as a right outer second electrode. Therefore, the aperture ratio can be maximized.

Meanwhile, in the second embodiment of FIG. 8, even though the thin film transistor Tr is connected to the first data line 233a and the second gate line 205b and is disposed in a lower left area of the pixel region P, the thin film transistor Tr may be connected to the first data line 233a and the first gate line 205a and may be disposed in an upper left area of the pixel region P. At this time, the storage capacitor StgC may be adjacent to the first gate line 205a.

The second embodiment has differences from the first embodiment in that the storage capacitor StgC is adjacent to the thin film transistor Tr, the left outer one of the first electrodes 262 is connected to the drain electrode 239 of the thin film transistor Tr and is adjacent to the first data line 233a, and the second data line 233b functions as the right outer second electrode. Here, the first and second electrodes 262 and 268 are alternately arranged with each other with a first distance d1 therebetween. A distance between the second data line 233b and the first electrode 262 adjacent to the second data line 233b is equal to the first distance d1.

Since the array substrate according to the second embodiment does not include the second storage capacitor StgC2 of FIG. 4 in the first embodiment, metallic material layers are not required on and beneath a passivation layer (not shown) to form the second storage capacitor StgC2 of FIG. 4. That is, it is not required that the left outer first electrode 262 is formed on the same layer and of the same material as the first and second data lines 233a and 233b. Accordingly, the first and second electrodes 262 and 268 can be formed on a different layer from the first and second data lines 233a and 233b. The first and second electrodes 262 and 268 may be formed of the same material. Here, since the left outer first electrode 262 is formed on a different layer from the first data line 233a and there occurs no electrical short between the left outer first electrode 262 and the first data line 233a, a distance d2 between the left outer first electrode 262 and the first data line 233a can be less than 5 μm within a range that the left outer first electrode 262 and the first data line 233a do not overlap each other.

Therefore, the aperture area of the pixel region P is increased. Moreover, because the second data line 233b functions as the outer second electrode and the second electrode 147 of FIG. 4 can be omitted, the aperture ratio is more improved. Furthermore, one thin film transistor is omitted in comparison with the first embodiment, and thus the aperture ratio is further improved.

Figure 9:
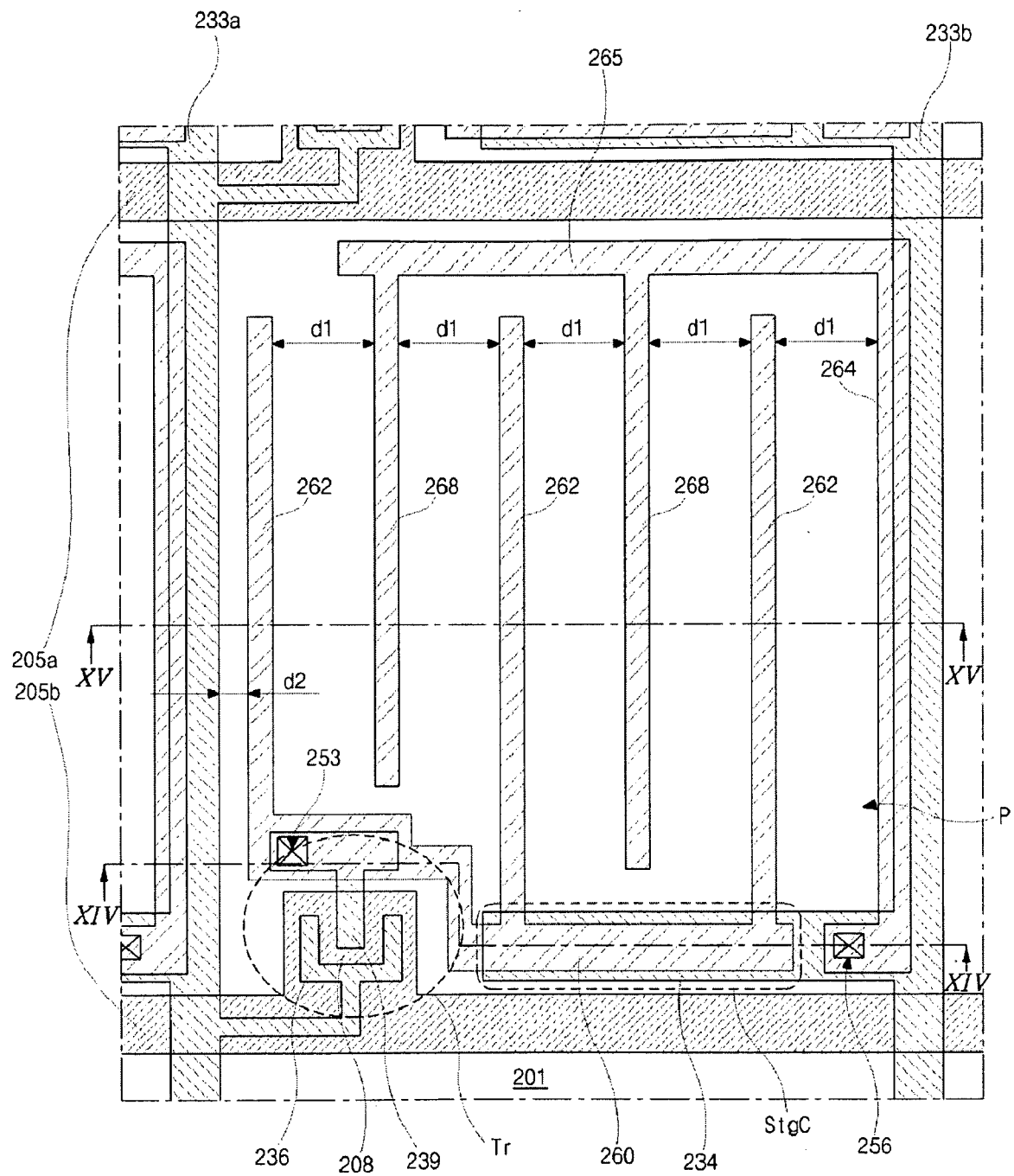
FIG. 9 and FIG. 10 are plan views schematically illustrating one pixel region of other exemplary array substrates for an IPS mode LCD device according to another embodiment of the invention.
Figure 10:
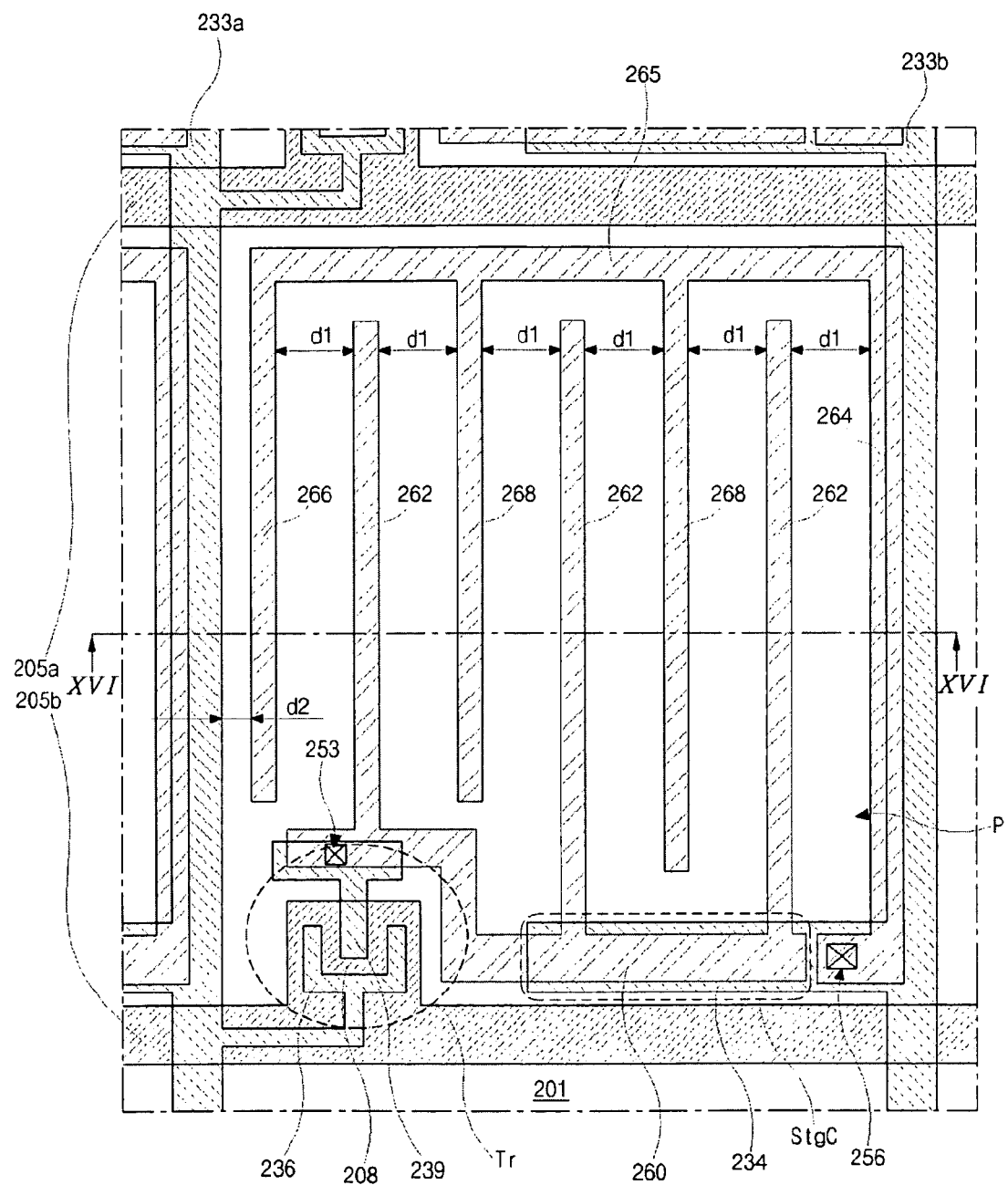

FIG. 9 and FIG. 10 are plan views schematically illustrating one pixel region of other exemplary array substrates for an IPS mode LCD device according to another embodiment of the present invention. The array substrates of FIG. 9 and FIG. 10 have structures similar to that of FIG. 8. In FIG. 9 and FIG. 10, the same parts as FIG. 8 may have the same references, and explanation of the same parts as FIG. 8 may be omitted. Referring to FIG. 9, the second extending portion 235 of FIG. 8 of the second data line 233b is omitted, and an extending portion 234 extends from the second data line 233b. At this time, the extending portion 234 overlaps the first pattern 260 connected to the drain electrode 239 of the thin film transistor Tr through the first contact hole 253, thereby forming a storage capacitor StgC.

A second contact hole 256 is formed over the extending portion 234. The second electrodes 268 on the same layer and of the same material as the first electrodes 262 extend from the second pattern 265. Another second electrode 264 on the same layer and of the same material as the second electrodes 268 further extends from the second pattern 265 and partially overlaps the second data line 233b. The another second electrode 264 may be defined as a right outer second electrode.

One end of the right outer second electrode 264 is connected to the second pattern 265, and the other end of the right outer second electrode 264 is connected to the extending portion 234 through the second contact hole 256. Accordingly, the second electrodes 268 and 264 are electrically connected to the second data line 233b.

In the structure of FIG. 9, it is more advantageous that a distance d1 between adjacent two of the first electrodes 262 and the second electrodes 268 and 264, which alternate with each other, is uniform. A horizontal electric field is induced between adjacent two of the first electrodes 262 and the second electrodes 268 and 264, which different signals are applied to, respectively.

More particularly, the first electrodes 262 and the second electrodes 268 and 264 are formed through the same process. There is no problem of different distances due to patterning margins when the first electrodes 262 and the second electrodes 268 and 264 are formed. In addition, the first electrodes 262 and the second electrodes 268 and 264 are formed on the same layer and of the same material, and the horizontal electric fields induced between the first electrodes 262 and the second electrodes 268 and 264 are uniform.

In FIG. 10, another second electrode 266 further extends from the second pattern 265 and is disposed between the first data line 233a and the left outer one of the first electrodes 262. The another second electrode 266 may be defined as a left outer second electrode. That is, the right outer second electrode 264 extends from one end of the second pattern 265 along a direction parallel to the first and second data lines 233a and 233b, and the left outer second electrode 266 extends from the other end of the second pattern 265 along the direction parallel to the first and second data lines 233a and 233b. Distances d1 between the first electrodes 262 and the second electrodes 268, 264 and 266 are the same. The right outer second electrode 264 is adjacent to the second data line 233b, and the left outer second electrode 266 is adjacent to the first data line 233a. As mentioned above, the right outer second electrode 264 partially overlap the second data line 233b. The left outer second electrode 266 is spaced apart from the first data line 233a by a distance of less than 5 μm within a range such that the left outer second electrode 266 does not overlap the first data line 233a.

Figure 11:
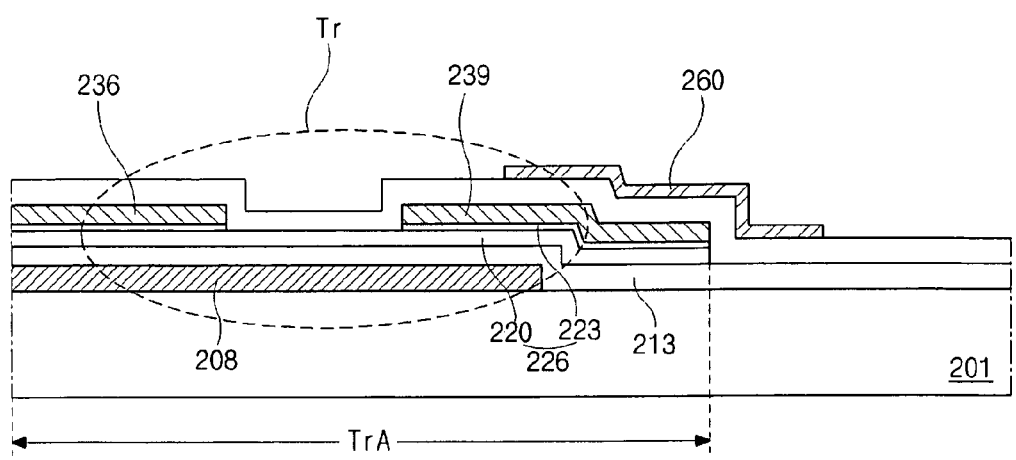
FIG. 11 is a cross-sectional view taken along the line XI-XI of FIG. 8.
Figure 12:
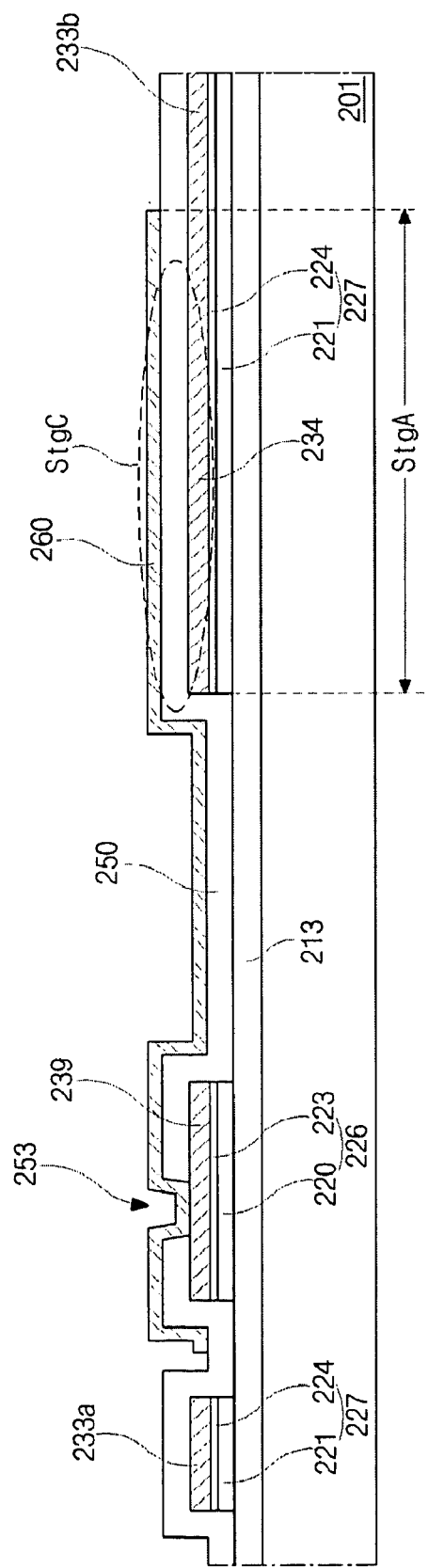
FIG. 12 is a cross-sectional view taken along the line XII-XII of FIG. 8.
Figure 13:
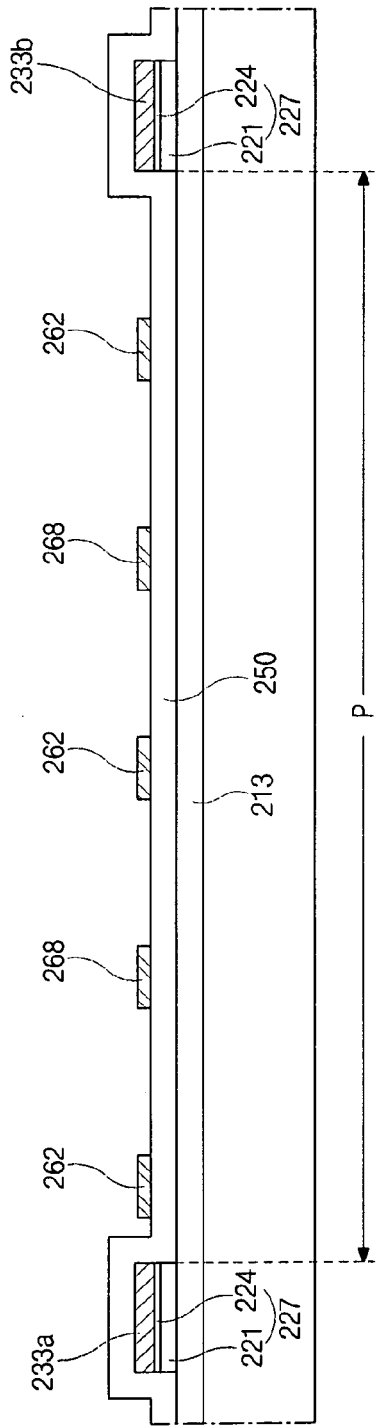
FIG. 13 is a cross-sectional view taken along the line XIII-XIII of FIG. 8.

FIG. 11 is a cross-sectional view taken along the line XI-XI of FIG. 8, FIG. 12 is a cross-sectional view taken along the line XII-XII of FIG. 8, and FIG. 13 is a cross-sectional view taken along the line XIII-XIII of FIG. 8. Here, for the convenience of explanation, a switching region TrA, where the thin film transistor is formed, and a storage region StgA, where the first storage capacitor is formed, are defined. Referring to FIGS. 8, 11, 12 and 13, the first and second gate lines 205a and 205b of a first metallic material are formed on the substrate 201. The gate electrode 208 is disposed in the switching region TrA and connected to the second gate line 205b. A gate insulating layer 213 is formed on the first and second gate lines 205a and 205b and the gate electrode 208. The gate insulating layer 213 may be formed of an insulating material on a substantially entire surface of the substrate 210 including the first and second gate lines 205a and 205b.

The first and second data lines 233a and 233b of a second metallic material are formed on the gate insulating layer 213. The first and second data lines 233a and 233b cross the first and second gate lines 205a and 205b to define the pixel region P. The first and second extending portions 234 and 235 extend from the second data line 233b into the pixel region P. The first extending portion 234 is spaced apart and parallel with the second gate line 205b. The first extending portion 234 extends into the storage region StgA and functions as a first capacitor electrode of the storage capacitor StgC.

In the switching region TrA, a semiconductor layer 226 including an active layer 220 and an ohmic contact layer 223 is formed on the gate insulating layer 213. The semiconductor layer 226 corresponds to the gate electrode 208. The ohmic contact layer 223 includes two portions spaced apart from each other. The source electrode 236 and the drain electrode 239, which are spaced apart from each other, are formed on the semiconductor layer 226. The source electrode 236 is connected to the first data line 233a. The source electrode 236 and the drain electrode 239 may be formed of the same material as the first and second data lines 233a and 233b. The gate electrode 208, the gate insulating layer 213, the semiconductor layer 226, the source electrode 236 and the drain electrode 239 constitute the thin film transistor Tr.

A semiconductor pattern 227 having a double-layered structure of a first semiconductor pattern 224 and a second semiconductor pattern 221 is formed under each of the first and second data lines 233a and 233b, the first extending portion 234 and the second extending portion 235. The first semiconductor pattern 224 is formed of the same material as the ohmic contact layer 223, and the second semiconductor pattern 121 is formed of the same material as the active layer 220. The semiconductor pattern 227 may be formed under each of the first and second data lines 233a and 233b, the first extending portion 234 and the second extending portion 235 according to a fabricating method of the array substrate. The semiconductor pattern 227 may be omitted by another fabricating process.

A passivation layer 250 is formed on the first and second data lines 233a and 233b, the thin film transistors Tr and the first and second extending portions 234 and 235. The passivation layer 250 has the first and second contact holes 253 and 255 respectively exposing a portion of the drain electrode 239 and a portion of the second extending portion 235. The passivation layer 250 may be formed of one of an inorganic insulating material and an organic insulating material.

Next, the first pattern 260 of a third metallic material is formed on the passivation layer 250 having the first and second contact holes 253 and 255. The first pattern 260 contacts the drain electrode 239 through the first contact hole 253 and overlaps the first extending portion 234 to form the storage capacitor StgC. The plurality of first electrodes 262 extend from the first pattern 260 and are spaced apart from each other. The second pattern 265 is formed on the passivation layer 250. The second pattern 265 contacts the second extending portion, 235 through the second contact hole 255. The second pattern 265 may be formed on the same layer and of the same material as the first electrodes 262. The second pattern 265 is spaced apart from and parallel to the first gate line 205a. The plurality of second electrodes 268 extend from the second pattern 265 and are spaced apart from each other. The first electrodes 262 and the second electrodes 268 are alternately arranged with each other. The left outer one of the first electrodes 262 is adjacent to the first data line 233a and is disposed between the first data line 233a and the left outer one of the second electrodes 268. The right outer one of the first electrodes 262 is adjacent to the second data line 233b, and the second data line 233b functions as the right outer second electrode. The first electrodes 262 are alternately arranged with the second electrodes 268 and the second data line 233b by a distance d1 therebetween.

In the above-mentioned structure, the second data line 233b functions as the right outer second electrode, and the left outer first electrode 262 adjacent to the first data line 233a is formed on the passivation layer 250 not on the same layer as the first data line 233a. In this case, a patterning margin, for example, of 5 µm to 7 µm, is not required to prevent electrical short between the first data line 233a and the left outer first electrode 262. The left outer first electrode 262 can be spaced apart from the first data line 233a by a distance d2, for example, less than 5 µm within a range such that the left outer first electrode 262 does not overlap the first data line 233a. Moreover, since there exists one thin film transistor Tr in the pixel region P, the array substrate according to the second embodiment has an increased aperture ratio as compared with the first embodiment.

Figure 14:
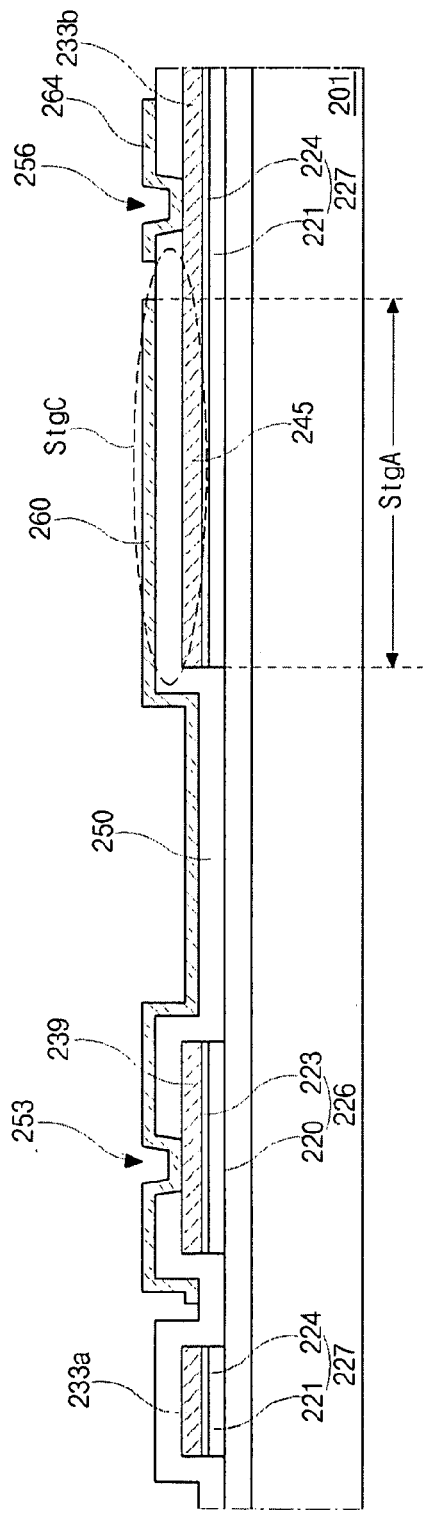
FIG. 14 is a cross-sectional view taken along the line XIV-XIV of FIG. 9.
Figure 15:
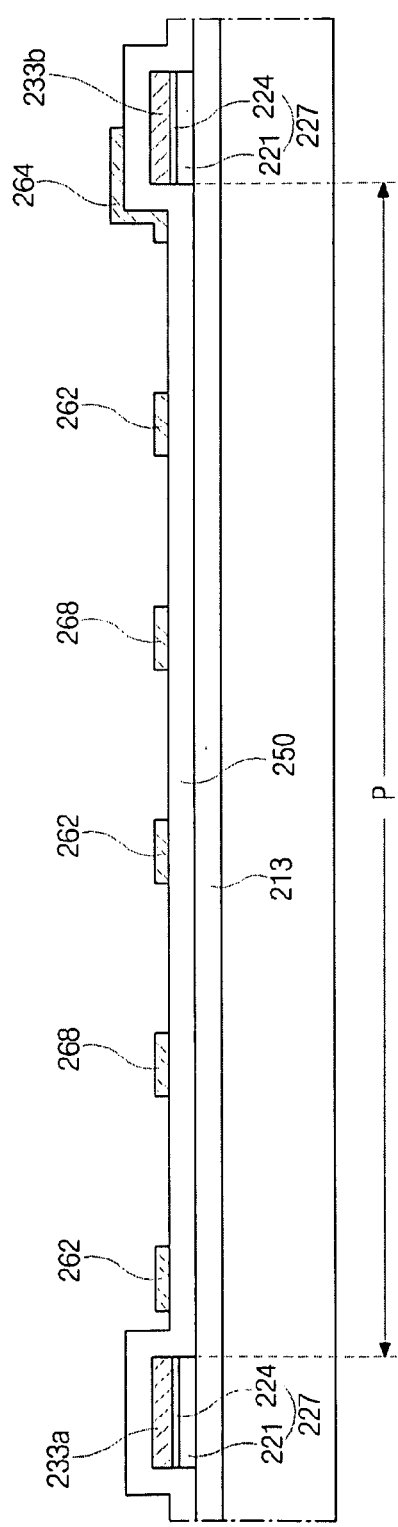
FIG. 15 is a cross-sectional view taken along the line XV-XV of FIG. 9.

FIG. 14 is a cross-sectional view taken along the line XIV-XIV of FIG. 9, and FIG. 15 is a cross-sectional view taken along the line XV-XV of FIG. 9. The array substrate of FIG. 9 has the same cross-sectional structure in the switching region as that of FIG. 8, and a drawing of the structure in the switching region will be omitted. Referring to FIGS. 9, 14 and 15, as compared with the structure of FIG. 8, 11, 12 and 13, the right outer second electrode 264 is further formed on the passivation layer 250 and partially overlaps the second data line 233b. Additionally, only the extending portion 234 extends from the second data line 233b. The extending portion 234 is adjacent to and parallel with the second gate line 205b. The second contact hole 256 is formed over the extending portion 234.

More particularly, the right outer second electrode 264 is formed of the same material as the first electrodes 262 and the second electrodes 268 on the passivation layer 250 and partially overlaps the second data line 233b. Accordingly, the difference is minimized in the distance d1 between adjacent first and second electrodes 262 and 268 and the distance d1 between the right outer second electrode 264 and the first electrode 262 adjacent thereto in comparison to the structure of FIG. 8, 11, 12 and 13, where the second data line 233b functions as the right outer second electrode.

Figure 16:
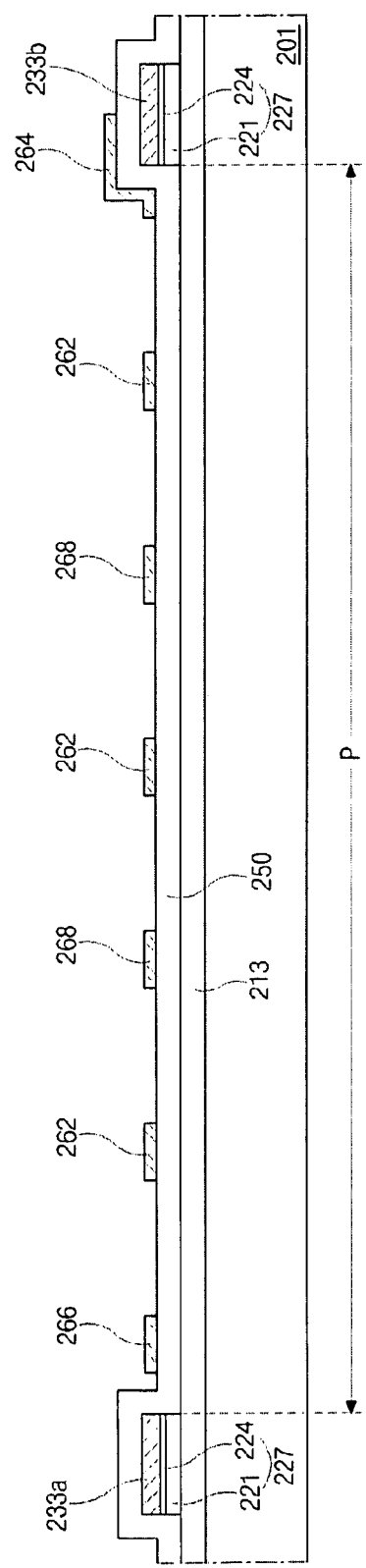
FIG. 16 is a cross-sectional view taken along the line XVI-XVI of FIG. 10.

FIG. 16 is a cross-sectional view taken along the line XVI-XVI of FIG. 10. The array substrate of FIG. 10 has the same cross-sectional structures in the switching region and in the storage region as that of FIG. 8, and drawings of the structures in the switching region and in the storage region will be omitted. Referring to FIGS. 10 and 16, the elements under the passivation layer 250 are the same as those in FIGS. 14 and 15. The left outer second electrode 266 and the right outer second electrode 264 are formed on the passivation layer 250. The left outer second electrode 266 is connected to the second pattern 265 and is spaced apart from the first data line 233a by the distance of less than 5 µm. The right outer second electrode 264 is connected to the second pattern 265 and overlaps the second data line 233b.

In addition, the plurality of first electrodes 262 and the plurality of second electrodes 268 are formed on the passivation layer 250. The plurality of second electrodes 268 extend from the second pattern 265 and are spaced apart from each other between the left and right outer second electrodes 266 and 264. The plurality of first electrodes 262 extend from the first pattern 260, which is connected to the drain electrode 239 of the thin film transistor Tr through the first contact hole 253, and alternate with the plurality of second electrodes 268 between the left and right outer second electrodes 266 and 264.

A fabricating method of the array substrate for an IPS mode LCD device according to the second embodiment of the present invention will be explained with reference to FIGS. 8, 11, 12 and 13. First, the first and second gate lines 205a and 205b and the gate electrode 208 are formed on the substrate 201 by depositing a first metallic material and then patterning through a mask process, which includes steps of forming a photoresist layer, light-exposing the photoresist layer, developing the light-exposed photoresist layer to form a photoresist pattern, and etching the first metallic material exposed by the photoresist pattern. The first and second gate lines 205a and 205b extend along a first direction and are spaced apart from each other. The gate electrode 208 is disposed in the switching area TrA and is connected to the second gate line 205b. The first and second gate lines 205a and 205b are respectively defined as upper and lower ones with respect to the pixel region P. Therefore, the first gate line 205a may be the second gate line in another pixel region.

Next, the gate insulating layer 213 is formed on the first and second gate lines 205a and 205b and the gate electrode 208 by depositing an inorganic insulating material, for example, silicon oxide ($SiO_2$) or silicon nitride ($SiN_X$). The gate insulating layer 213 may be formed on a substantially entire surface of the substrate 201 including the first and second gate lines 205a and 205b and the gate electrode 208.

An intrinsic amorphous silicon layer (not shown), an impurity-doped amorphous silicon layer (not shown) and a second metallic material layer (not shown) are subsequently formed on the gate insulating layer 213 and then patterned, thereby forming the active layer 220 of amorphous silicon, the ohmic contact layer 223 of impurity-doped amorphous silicon, and the source and drain electrodes 236 and 239. The active layer 220 corresponds to the gate electrode 208 in the pixel region P. The ohmic contact layer 223 is disposed over the active layer 220 and includes two parts spaced apart from each other. The source and drain electrodes 236 and 239 are disposed over the ohmic contact layer 223 and spaced part from each other. The intrinsic amorphous silicon layer, the impurity-doped amorphous silicon layer and the second metallic material layer are patterned through one mask process using a mask with diffraction patterns or halftone patterns. The intrinsic amorphous silicon layer, the impurity-doped amorphous silicon layer and the second metallic material layer may be separately patterned through two mask processes.

The first and second data lines 233a and 233b are formed simultaneously with the source and data lines 236 and 239. The first and second data lines 233a and 233b cross the first and second gate lines 205a and 205b to define the pixel region P. The source electrode 236 is connected to the first data line 233a. In addition, the first extending portion 234 extending from the second data line 233b is formed in the storage region StgA. The first extending portion 234 is parallel with and adjacent to the second gate line 205b. The second extending portion 235 extending from the second data line 233b is formed to be adjacent to and parallel with the first gate line 205a. In other array substrates of the second embodiment in FIG. 9 and 10, the second extending portion may be omitted.

The semiconductor pattern 227 is formed under each of the first and second data lines 233a and 233b and the first and second extending portions 234 and 235 because the semiconductor layer 226, the first and second data lines 233a and 233b, the source electrode 236 and the drain electrode 239 are formed through one mask process. The semiconductor pattern 227 has a double-layered structure of the impurity-doped amorphous silicon pattern 224 and the intrinsic amorphous silicon pattern 221. On the other hand, according to two mask processes, the semiconductor layer 226 of an island shape including the active layer 220 and the ohmic contact layer 223 is formed to correspond to the gate electrode 208, and there may be no semiconductor pattern under the first and second data lines 233a and 233b and the first and second extending portions 234 and 235. The gate electrode 208, the gate insulating layer 213, the active layer 220, the ohmic contact layer 223, the source electrode 236 and the drain electrode 239 in the switching region TrA constitute the thin film transistor Tr.

The passivation layer 250 is formed on the first and second data lines 233a and 233b, the first and second extending portions 234 and 235 and the thin film transistor Tr by depositing an inorganic insulating material such as silicon oxide (SiO2) or silicon nitride (SiNX). Sequentially, the passivation layer 250 is patterned through a mask process to there form the first contact hole 253 exposing the drain electrode 239 and the second contact hole 255 exposing the second extending portion 235. Meanwhile, in FIG. 9 and FIG. 10, the second contact hole 256 exposes the first extending portion 234.

Next, the first pattern 260, the plurality of first electrodes 262, the second pattern 265 and the plurality of second electrodes 268 are formed by deposing a third metallic material, for example, a transparent conductive material such as indium tin oxide (ITO) or indium zinc oxide (IZO), on the passivation layer having the first and second contact holes 253 and 255 and then patterning the third metallic material through a mask process. The first pattern 260 is connected to the drain electrode 239 through the first contact hole 253. The first pattern 260 extends into the storage region StgA to overlap the first extending portion 234 and functions as the second electrode of the storage capacitor StgC. The plurality of first electrodes 262 extend from the first pattern 260 and are spaced apart from each other. The first electrode 262 adjacent to the first data line 233a is defined as the left outer first electrode. The second pattern 265 is connected to the second extending portion 235 through the second contact hole 255 and is parallel with and spaced apart from the first gate line 205a. The plurality of second electrodes 268 extend from the second pattern 265 and alternate with the plurality of first electrodes 262. Meanwhile, in FIG. 9 and FIG. 10, the right outer second electrode 264 is further formed and is connected to the second pattern 265 and the extending portion 234 through the second contact hole 256. The right outer second electrode 264 partially overlaps the second data line 233b. Furthermore, in FIG. 10, the left outer second electrode second 266 is further formed and is connected to the end of the second pattern 265. The left outer second electrode 266 is adjacent to the first data line 233a and is spaced apart from the first data line 233a by the distance of less than 5 μm.

Like this, the array substrate for an IPS mode LCD device according to an embodiment of the invention is completed.

In the array substrate for an IPS mode LCD device according to an embodiment of the invention, the horizontal electric field is induced between the first electrodes and the second electrodes without the common line and the common electrodes, wherein the first electrodes are connected to the thin film transistor contacting the first data line and the second electrodes are connected to the second data line. Therefore, an additional compensation or tuning for a difference in a common voltage resulted from charging of a constant voltage is not required, and production costs can decrease. Moreover, the aperture ratio is improved as compared with the related art having the outer common electrode that is adjacent to and spaced apart from the data line. In addition, since the high and low signal voltages have a pulse pattern, problems, such as a flicker phenomenon, can be prevented such that the IPS mode LCD device has an improved image quality.

Moreover, since the first and second electrodes are formed on a different layer from the first and second data lines, the distance between the first or second data line and the first or second electrode adjacent to the first and second data line is less than 5 μm, and the first or second electrode partially overlaps the first or second data line to thereby more increase the aperture ratio.

Furthermore, because one thin film transistor is formed in the pixel region and the first or second data line functions as the outer electrode, the aperture ratio is more improved.

The second electrodes are electrically connected to the data line, and thus drop of the data signal voltage applied to the data line can be prevented. According to this, there is no voltage lower than the gate signal turning off the thin film transistor, and it is improved to uniformly maintain the signal voltage in the pixel region until the next signal voltage is applied.

Additionally, in the case that the storage capacitor is charged through the thin film transistor and the data line, the charging ability is improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An array substrate for an in-plane switching mode liquid crystal display device, comprising:
   a gate line on a substrate;
   a gate insulating layer on the gate line;
   first and second data lines on the gate insulating layer and crossing the gate line to define a pixel region;
   a first extending portion on the gate insulating layer and extending from the second data line;
   a thin film transistor connected to the gate line and the first data line;
   a passivation layer on the first and second data lines and the thin film transistor, the passivation layer having a first contact hole exposing a drain electrode of the thin film transistor;
   a first pattern in the pixel region on the passivation layer, the first pattern connected to the drain electrode through the first contact hole and overlapping the first extending portion;
   a plurality of first electrodes extending from the first pattern, the plurality of first electrodes parallel to the first and second data lines;
   a second pattern in the pixel region on the passivation layer and parallel to gate line, the second pattern electrically connected to the second data line; and
   a plurality of second electrodes extending from the second pattern and alternating with the plurality of first electrodes by a first distance between adjacent first and second electrodes,
   wherein one of the plurality of first electrodes is spaced apart from the second data line by a distance equal to the first distance or more than the first distance and less than double the first distance, and another of the plurality of first electrodes or one of the plurality of second electrodes is spaced apart from the first data line by a second distance narrower than the first distance.

2. The array substrate according to claim 1, wherein the second distance is more than 0 μm and less than 5 μm.

3. The array substrate according to claim 1, wherein the plurality of first electrodes, the plurality of second electrodes, the first pattern and the second pattern are formed on a same layer and of a same material.

4. The array substrate according to claim 1, wherein the first extending portion and the first pattern overlapping each other with the passivation layer therebetween form a storage capacitor.

5. The array substrate according to claim 1, further comprising a second extending portion extending from the second data line, wherein the passivation layer has a second contact hole exposing the second extending portion, and the second pattern contacts the second extending portion through the second contact hole.

6. The array substrate according to claim 5, wherein the distance between the second data line and the one of the plurality of first electrodes is equal to the first distance.

7. The array substrate according to claim 5, wherein the another of the plurality of first electrode is spaced apart from the first data line by the second distance.

8. The array substrate according to claim 1, wherein the passivation layer has a second contact hole exposing the first extending portion, and another of the plurality of second electrodes partially overlaps the second data line and contacts the first extending portion through the second contact hole.

9. The array substrate according to claim 8, wherein the one of the plurality of second electrode is spaced apart from the first data line by the second distance.

10. The array substrate according to claim 8, wherein the distance between the second data line and the one of the plurality of first electrodes is more than the first distance and less than double the first distance.

11. A fabricating method of an array substrate for an in-plane switching mode liquid crystal display device, comprising:
    forming a gate line on a substrate;
    forming a gate insulating layer on the gate line;
    forming first and second data lines on the gate insulating layer and crossing the gate line to define a pixel region;
    forming a first extending portion on the gate insulating layer and extending from the second data line;
    forming a thin film transistor connected to the gate line and the first data line;
    forming a passivation layer on the first and second data lines and the thin film transistor, the passivation layer having a first contact hole exposing a drain electrode of the thin film transistor;
    forming a first pattern in the pixel region on the passivation layer, the first pattern connected to the drain electrode through the first contact hole and overlapping the first extending portion;
    forming a plurality of first electrodes extending from the first pattern, the plurality of first electrodes parallel to the first and second data lines;
    forming a second pattern in the pixel region on the passivation layer and parallel to gate line, the second pattern electrically connected to the second data line; and
    forming a plurality of second electrodes extending from the second pattern and alternating with the plurality of first electrodes by a first distance between adjacent first and second electrodes,
    wherein one of the plurality of first electrodes is spaced apart from the second data line by a distance equal to the first distance or more than the first distance and less than double the first distance, and another of the plurality of first electrodes or one of the plurality of second electrodes is spaced apart from the first data line by a second distance narrower than the first distance.

12. The method according to claim 11, wherein the plurality of first electrodes, the plurality of second electrodes, the first pattern and the second pattern are formed through a same mask process.

13. The method according to claim 11, further comprising a step of forming a second extending portion extending from the second data line, wherein forming the passivation layer includes forming a second contact hole exposing the second extending portion, and the second pattern contacts the second extending portion through the second contact hole.

14. The method according to claim 11, wherein forming the passivation layer includes a second contact hole exposing the first extending portion, and another of the plurality of second electrodes partially overlaps the second data line and contacts the first extending portion through the second contact hole.

* * * * *